(12) United States Patent
Omata (10) Patent No.: US 10,958,802 B2
(45) Date of Patent: Mar. 23, 2021

(54) IMAGE FORMING APPARATUS, CONTROL METHOD OF IMAGE FORMING APPARATUS, AND STORAGE MEDIUM

(71) Applicant: CANON KABUSHIKI KAISHA, Tokyo (JP)

(72) Inventor: Jun Omata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/459,239

(22) Filed: Jul. 1, 2019

(65) Prior Publication Data

US 2020/0021695 A1 Jan. 16, 2020

(30) Foreign Application Priority Data

Jul. 10, 2018 (JP) .................................. 2018-130395

(51) Int. Cl.
*H04N 1/00* (2006.01)
(52) U.S. Cl.
CPC .................................. *H04N 1/0097* (2013.01)
(58) Field of Classification Search
CPC ............... H04N 1/0097; H04N 1/2104; H04N 2201/218
USPC ........................................................ 358/1.13
See application file for complete search history.

(56) References Cited

U.S. PATENT DOCUMENTS

| 6,430,662 | B1* | 8/2002 | Hurich | G11C 16/102 |
| | | | | 711/162 |
| 2013/0304980 | A1* | 11/2013 | Nachimuthu | G06F 9/4403 |
| | | | | 711/103 |
| 2016/0266838 | A1* | 9/2016 | Jung | G06F 9/4416 |
| 2016/0350633 | A1* | 12/2016 | Suwabe | G06F 3/1271 |
| 2017/0019556 | A1* | 1/2017 | Sekine | H04N 1/32122 |
| 2017/0180582 | A1* | 6/2017 | Kodama | H04N 1/00891 |
| 2018/0146111 | A1* | 5/2018 | Shimakawa | H04N 1/00962 |
| 2018/0338057 | A1* | 11/2018 | Ito | H04N 1/00209 |

FOREIGN PATENT DOCUMENTS

| JP | 2004-186795 A | 7/2004 |
| JP | 2017-27244 A | 2/2017 |

* cited by examiner

*Primary Examiner* — Allen H Nguyen
(74) *Attorney, Agent, or Firm* — Canon U.S.A., Inc. IP Division (57) ABSTRACT

An image forming apparatus including a first storage unit includes an initialization unit configured to perform initialization on the first storage unit, wherein the first storage unit stores at least first data and second data, and the initialization unit performs initialization to restore the first data to a setting value at a time of shipment from a factory and retain, as the second data, a setting value immediately before the initialization is performed.

9 Claims, 8 Drawing Sheets

IMAGE FORMING APPARATUS, CONTROL METHOD OF IMAGE FORMING APPARATUS, AND STORAGE MEDIUM

BACKGROUND

Field of the Disclosure

The present disclosure relates to an image forming apparatus, especially, an image forming apparatus provided with a storage unit which stores a setting value of a device and the like.

Description of the Related Art

A conventional image forming apparatus is provided with a storage device for storing information such as various setting values in the image forming apparatuses and a total number of printed sheets.

In a case where an abnormality occurs in the storage device included in the image forming apparatus, it is sometimes required to initialize the storage device to restore various stored setting values to a state at a time of shipment from a factory.

For example, Japanese Patent Application Laid-Open No. 2004-186795 discusses an image forming apparatus configured to write an initial value of an adjustment value adjusted in a factory in a flash memory different from a flash memory in which an adjustment value specific to the image forming apparatus is written and thus can easily restore the adjustment value at the time of shipment from the factory.

Japanese Patent Application Laid-Open No. 2017-27244 discusses an image forming apparatus from which information about a total number of printed sheets counted in the image forming apparatus is not deleted even in a case where a setting of the image forming apparatus is restored to a state at the time of shipment from a factory.

SUMMARY

According to the present disclosure, an image forming apparatus including a first storage unit includes an initialization unit configured to perform initialization on the first storage unit, wherein the first storage unit stores at least first data and second data, and wherein the initialization unit performs initialization to restore the first data to a setting value at a time of shipment from a factory and retain, as the second data, a setting value immediately before the initialization is performed.

Further features of the present disclosure will become apparent from the following description of exemplary embodiments with reference to the attached drawings.

DESCRIPTION OF THE EMBODIMENTS

Various exemplary embodiments according to the present disclosure will be described below with reference to the attached drawings.

Figure 1:
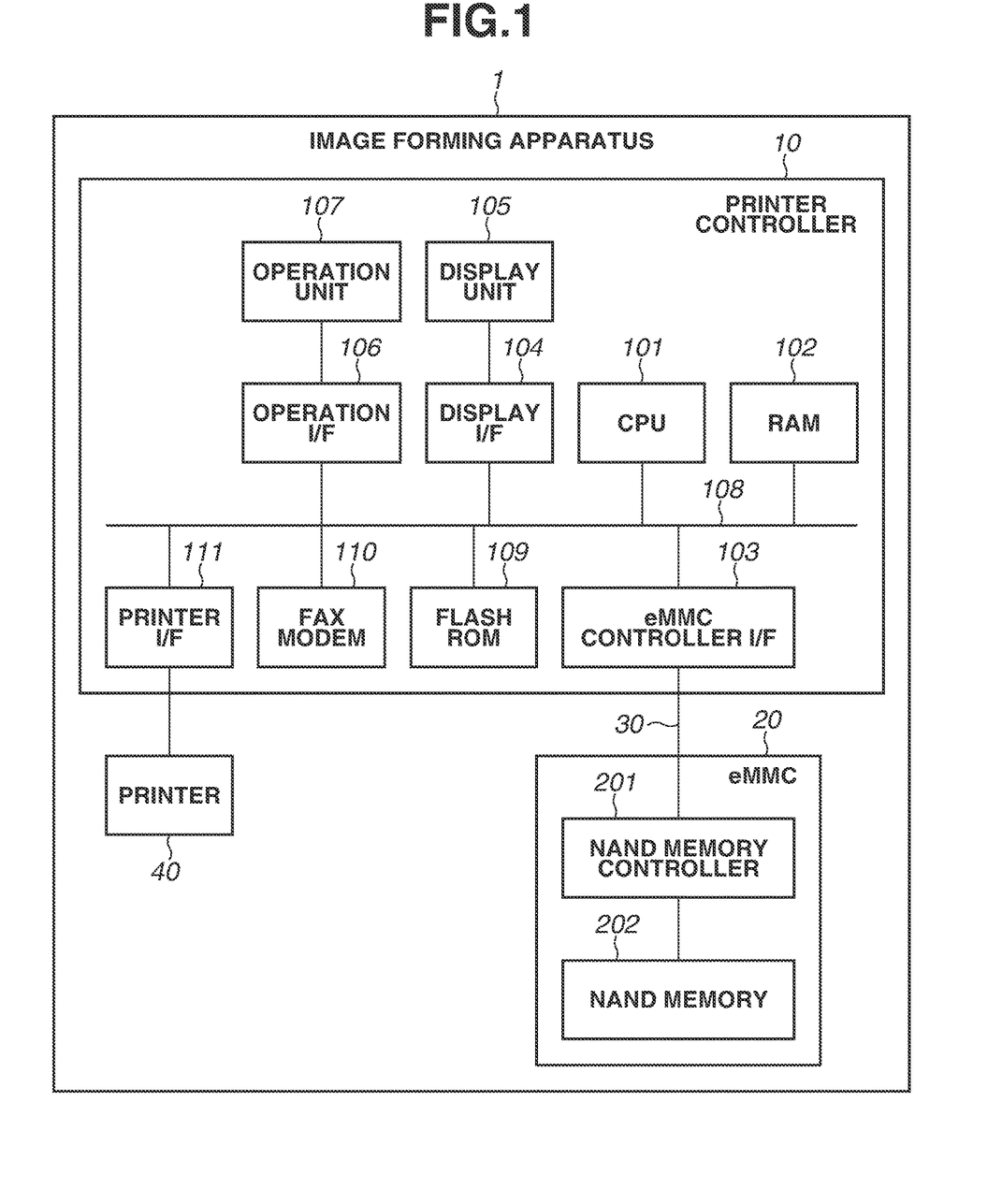
FIG. 1 illustrates a hardware configuration of an image forming apparatus.

FIG. 1 illustrates a hardware configuration of an image forming apparatus 1.

A printer controller 10 included in the image forming apparatus 1 is connected to an embedded MultiMediaCard (eMMC) 20 via a bus 30.

A central processing unit (CPU) 101 in the printer controller 10 is a controller for entirely controlling the printer controller 10 and performs various calculations.

A random access memory (RAM) 102 is a system work memory for enabling the CPU 101 to operate. Data and a program developed from the eMMC 20 in the RAM 102 are used by the CPU 101 for calculations and various types of control.

An eMMC controller interface (I/F) 103 controls the eMMC 20 via the bus 30 upon receiving an instruction from the CPU 101.

A display I/F 104 is an interface connected to a display unit 105 and transmits a display signal to the display unit 105.

The display unit 105 includes a liquid crystal panel and a light-emitting diode (LED) and displays information to be presented to a user.

An operation IF 106 is an interface connected to an operation unit 107. The operation I/F 106 receives a user operation from the operation unit 107 as an electrical signal.

The operation unit 107 includes a touch panel and a button.

A flash read-only memory (ROM) 109 is a nonvolatile memory which stores a start-up program (a boot program), a user data initialization flag to be described below, data at the time of shipment, and the like.

A facsimile modulator-demodulator (FAX modem) 110 is a module for transmitting and receiving FAX data and is connected to a telephone line (not illustrated).

FAX reception data is temporarily stored in the eMMC 20 as a FAX reception image file. FAX transmission data is also temporarily stored in the eMMC 20 as a FAX transmission image file.

A printer I/F 111 connected to a printer 40 transmits print data and a printer control command to the printer 40 and receives a response from the printer 40.

The above-described modules are connected to each other via a controller bus 108.

The eMMC 20 includes an inverted AND (NAND) memory controller 201 and a NAND memory 202.

The NAND memory controller 201 is connected to the eMMC controller I/F 103 via the bus 30. The NAND memory controller 201 receives a command from the eMMC controller I/F 103 and transmits data and a response based on the received command to the eMMC controller I/F 103 via the bus 30. A command to be received includes a securely-erasing command, a writing command, and a reading command.

The NAND memory controller 201 is connected to the NAND memory 202 and interprets a command received from the eMMC controller I/F 103.

In a case where the NAND memory controller 201 receives a secure-erasing command, the NAND memory controller 201 securely erases data stored in the NAND memory 202.

In a case where the NAND memory controller 201 receives a writing command, the NAND memory controller 201 writes data received from the eMMC controller I/F 103 via the bus 30 in the NAND memory 202.

In a case where the NAND memory controller 201 receives a reading command, the NAND memory controller 201 reads data from the NAND memory 202 and transmits the read data to the printer controller 10 via the bus 30.

The eMMC 20 has a wear leveling function and performs control to prevent data writing from concentrating on a specific physical address in the NAND memory 202.

In a case where the NAND memory controller 201 receives a writing command, the eMMC 20 analyzes logical address information included in the writing command to find a physical address of the NAND memory 202 to which data is actually written. Subsequently, the eMMC 20 compares the number of times data has been written to the found physical address with the number of times data has been written to other physical addresses which are not used, and writes data to a memory having a physical address to which data has been written a smaller number of times. The NAND memory controller 201 rewrites the physical address corresponding to a logical address.

Therefore, if the same logical address is overwritten from the eMMC controller I/F 103, the overwritten data may remain in the NAND memory 202 in some cases. In addition, the NAND memory 202 includes data about a physical address which does not correspond to a logical address.

Figure 2:
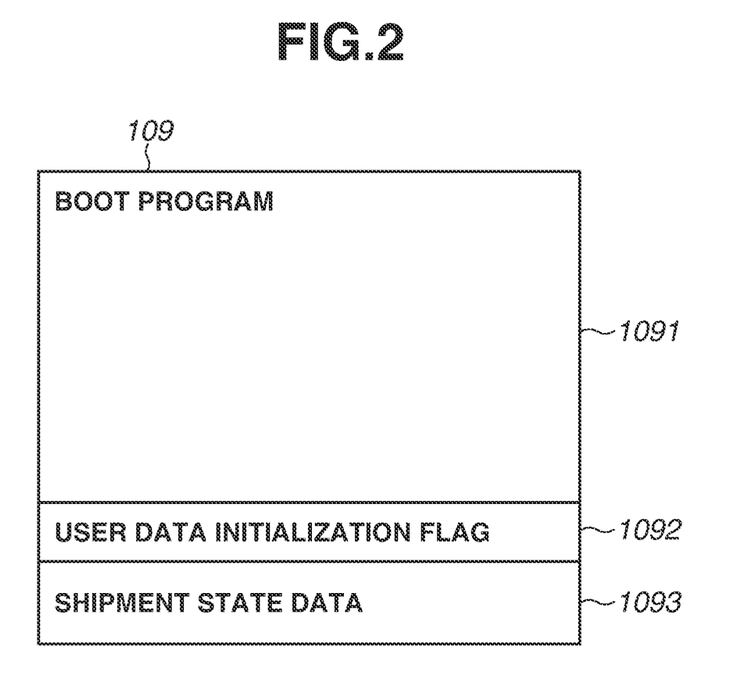
FIG. 2 illustrates internal data in a flash read-only memory (ROM).

FIG. 2 illustrates a structure of internal data in the flash ROM 109.

The flash ROM 109 stores the boot program for starting the image forming apparatus 1 in an area 1091. In a case where the image forming apparatus 1 is started, the CPU 101 reads the boot program from the area 1091 and executes the boot program. When processing based on the boot program is executed, the eMMC 20 can perform reading and writing of data and a program.

The user data initialization flag indicating whether to initialize user setting data is stored in an area 1092. In a case where a user executes initialization of the user setting data, the user data initialization flag is set to be ON.

Shipment state data, which is the user setting data at the time of shipment from the factory, is stored in an area 1093. The data at the time of shipment from the factory is written in the area 1093 when the image forming apparatus is shipped from the factory.

The time of shipment from the factory generally means a time from when the image forming apparatus is manufactured to when the image forming apparatus is transferred to a user. The time of shipment from the factory also includes a time when the printer controller 10 is replaced and a new printer controller 10 is installed after the image forming apparatus is used by a user.

Figure 3:
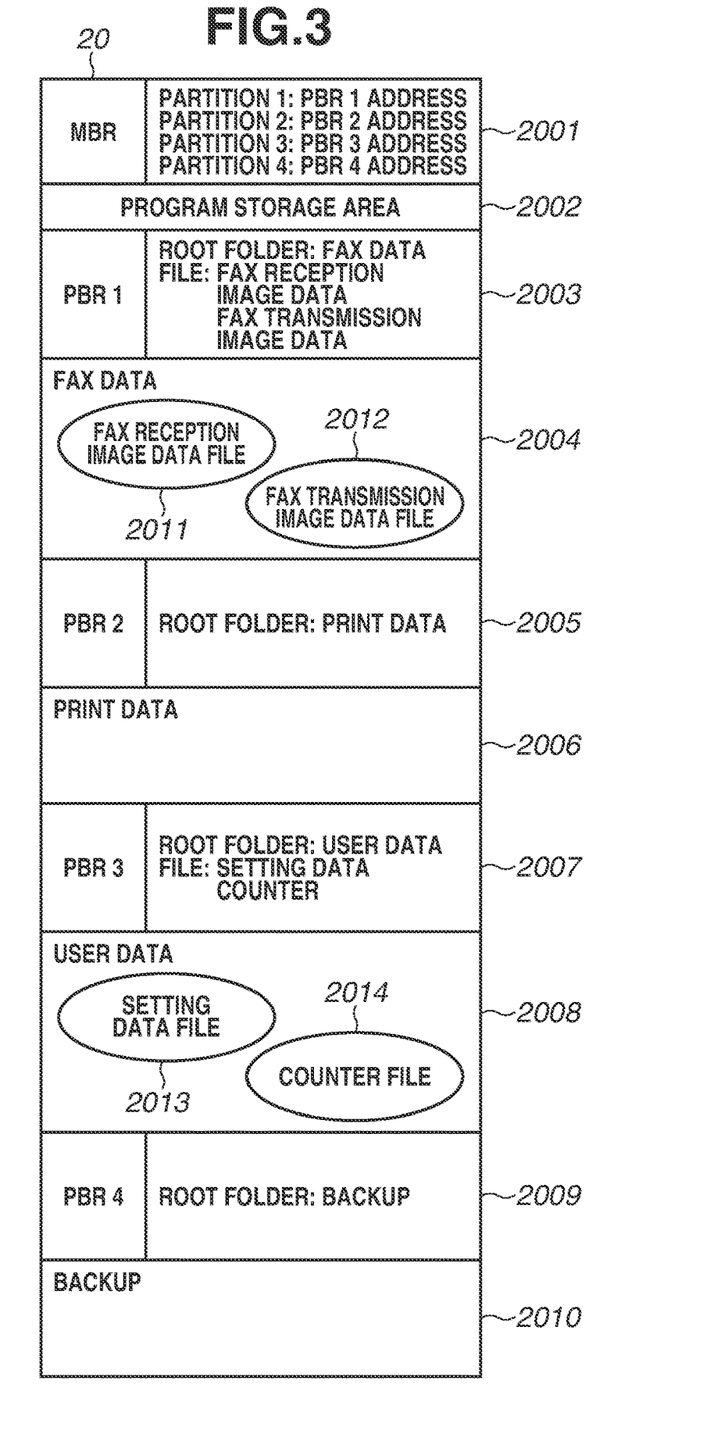
FIG. 3 illustrates internal data in an embedded MultiMediaCard (eMMC).

FIG. 3 illustrates a structure of internal data in the eMMC 20.

The boot program in the area 1091 is started up, and then, the printer controller 10 can read a program in a program storage area 2002 and execute the read program.

The eMMC 20 includes a plurality of divided storage areas ("partitions"). In an example illustrated in FIG. 3, there are four partitions from a partition boot record (PBR) 1 to a PBR 4 to be described below.

The eMMC 20 includes an area of a master boot record (hereinbelow, referred to as "MBR") 2001. In the MBR 2001, a plurality of pieces of partition information of the internal data in the eMMC 20 is described. The partition information includes data (a partition boot record, hereinbelow, referred to as "PBR") indicating an address each partition is started from. The printer controller 10 recognizes the partition based on the PBR.

In the example illustrated in FIG. 3, four PBRs namely the PBR 1: 2003, the PBR 2: 2005, the PBR 3: 2007, and the PBR 4: 2009 are described in the MBR 2001.

The CPU 101 reads the MBR 2001 in the eMMC 20. Further, the CPU 101 reads the PBR 1: 2003, the PBR 2: 2005, the PBR 3: 2007, and the PBR 4: 2009 based on the partition information written in the MBR 2001 and confirms that the partitions exist. The CPU 101 makes the partitions available as software. The above-described processing is generally referred to as mounting of a volume.

A start address and a size of a data area managed in each of the partitions are described in the PBR 1: 2003, the PBR 2: 2005, the PBR 3: 2007, and the PBR 4: 2009.

Further, each of the PBRs includes a description of a data area in which information about a file and a folder managed in each of the partition is described.

Deletion of the file and the folder managed in each partition is performed in such a manner that data describing the information about the file and the folder is deleted so that the file and the folder are in a deleted state. In other words, data in the file and data in the folder are not actually deleted. Therefore, even if the file and the folder managed in each partition are deleted, the data in the file and the data in the folder can be restored by restoring the file and the folder in the deleted state.

In the example illustrated in FIG. 3, an address of the PBR 1 as a partition 1, an address of the PBR 2 as a partition 2, an address of the PBR 3 as a partition 3, and an address of the PBR 4 as a partition 4 are described in the MBR 2001.

In the PBR 1, it is described that a root folder name is "FAX data", and there are "FAX reception image data" and "FAX transmission image data" as files. The root folder name is a name of a folder in a top level of the partition and also a name of the partition. (The root folder name is generally assigned next to "C:" and thus often called as "C drive" and the like.)

In the PBR 2, a root folder name is "print data", and there is no file.

In the PBR 3, a root folder name is "user data", and there are "setting data" and "counter" as files.

In the PBR 4, a root folder name is "backup", and there is no file.

In a case where data described in the PBR 1: 2003, the PBR 2: 2005, the PBR 3: 2007, and the PBR 4: 2009 is deleted, the CPU 101 determines that there is no data in the file even if data in the file in each partition is not deleted.

A partition 2004 managed by the PBR 1: 2003 is used as an area in which a FAX reception image data file 2011 and a FAX transmission image data file 2012 are stored.

A partition 2006 managed by the PBR 2: 2005 is used as an area in which print data is stored.

A partition 2008 managed by the PBR 3: 2007 is used as an area in which a setting data file 2013 and a counter file 2014 are stored. User setting data and service setting data are stored in the setting data file 2013.

The user setting data is a setting value to be set on a normal setting screen in the image forming apparatus and is generally set by a user. On the other hand, the service setting data is a setting value to be set on a special setting screen (for example, a menu screen in a service mode described below) which is different from the normal setting screen. Generally, a user cannot set the service setting data, but a service person sets the service setting data for the user when the image forming apparatus is installed. A user referred to here means an individual or an organization, such as a company, who purchases and uses the image forming apparatus. Further, a service person means an individual or an organization, such as a company, who provides a service regarding the image forming apparatus to the user.

Data in which a total number of printed sheets or the like is recorded is stored in the counter file 2014.

Figure 4:
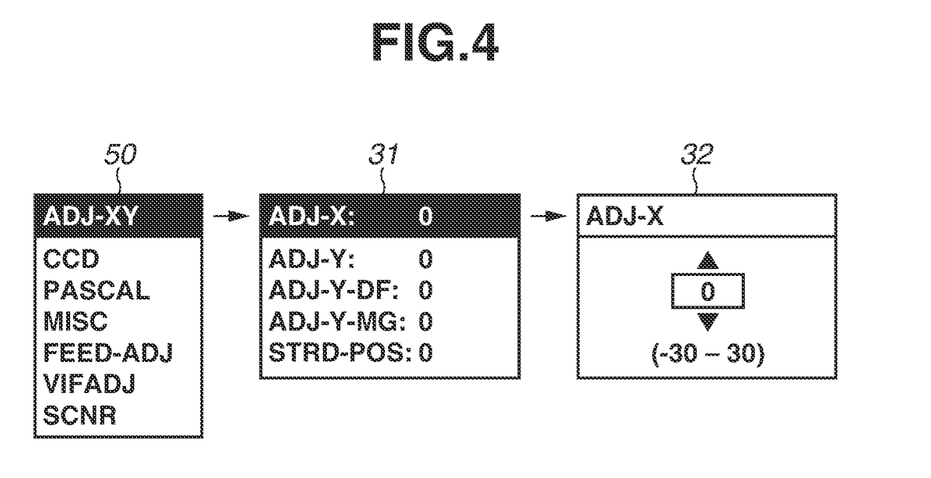
FIG. 4 illustrates an example of menu screens for setting a service mode.

FIG. 4 illustrates an example of menu screens on which the service person sets the service mode for the user.

A screen cannot be shifted to a menu screen 50 for setting the service mode even if a user performs a normal operation. The screen can be shifted to the menu screen 50 only when a service person performs a special operation in a special mode using a special tool, which only the service person knows.

The menu screens in the service mode are classified into hierarchies. If a specific setting value in the menu screen 50 is clicked, the menu screen 50 is shifted to a menu screen 31 in a next hierarchy. In a case where the screen is shifted to a menu screen 32 in a lowest hierarchy, the service person can change a setting value.

The setting value changed by the service person on the menu screen 32 in the lowest hierarchy is stored in the setting data file 2013 in the eMMC 20 as the service setting data.

The service setting data includes setting data set by the service person for the user in addition to data such as various adjustment values regarding the printer 40 and various adjustment values regarding the FAX modem 110. Therefore, if the service setting data is initialized by a user's operation, the setting data set by the service person may be erased, and a problem may occur in some cases.

FIGS. 5A to 5D each illustrate an example of transition of the internal data in a case where the eMMC 20 is initialized.

A state of the internal data in the eMMC 20 before initialization is started is similar to that illustrated in FIG. 3.

Figure 5A:
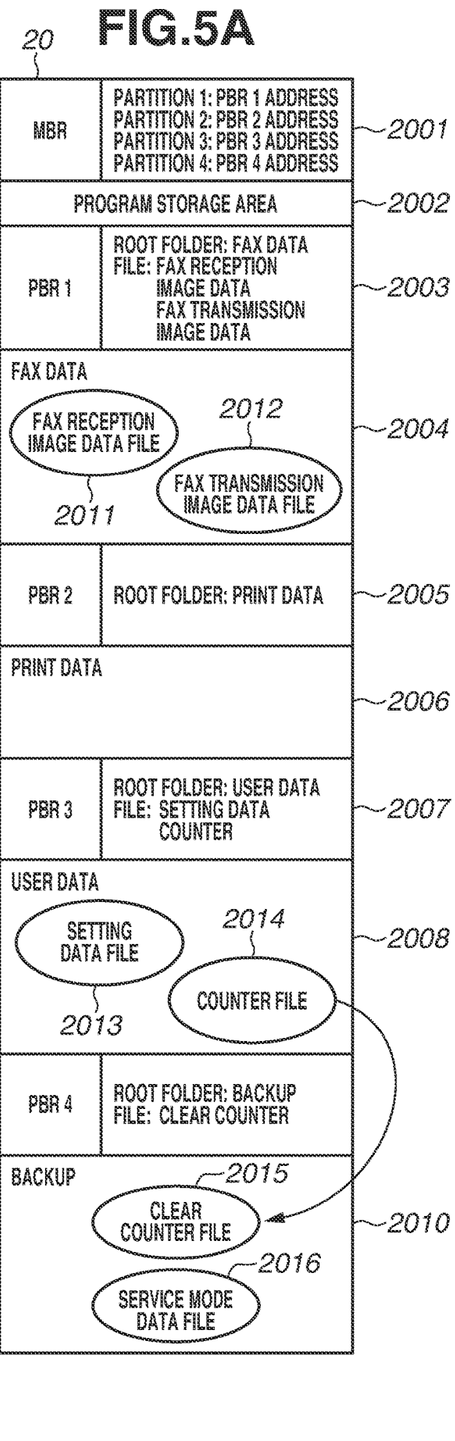
FIGS. 5A, 5B, 5C and 5D each illustrate transition of the internal data in the eMMC.

FIG. 5A illustrates a state of the internal data in the eMMC 20 at a stage of preparing deletion of the user data in the PBR 3.

In a case where the user executes initialization of the user data, the printer controller 10 reads the total number of printed sheets in the counter file 2014 from the eMMC 20 via the eMMC controller I/F 103 and develops the total number of printed sheets in the RAM 102. Further, the printer controller 10 initializes all data in the counter file 2014 except for the data on the total number of printed sheets developed in the RAM 102.

Subsequently, the printer controller 10 stores the counter file 2014 initialized and excluding the total number of printed sheets as a clear counter file 2015 in a backup area 2010 which is an area managed by the PBR 4: 2009.

The printer controller 10 further obtains the service setting data set by the service person from the menu screen in the service mode from the setting data file 2013. The printer controller 10 records all data used in the service mode such as identification (ID) indicating a setting value, a data size of the setting value, and the setting value in a service mode data file 2016.

Accordingly, the clear counter file 2015 in which the total number of printed sheets is recorded and the service mode data file 2016 in which the service setting data set by the service person is recorded are stored in the PBR 4 for a backup. In the service setting data, data in which a setting value can be changed by the user by a normal operation in a mode other than the service mode may be excluded from a file to be backed up.

Figure 5B:
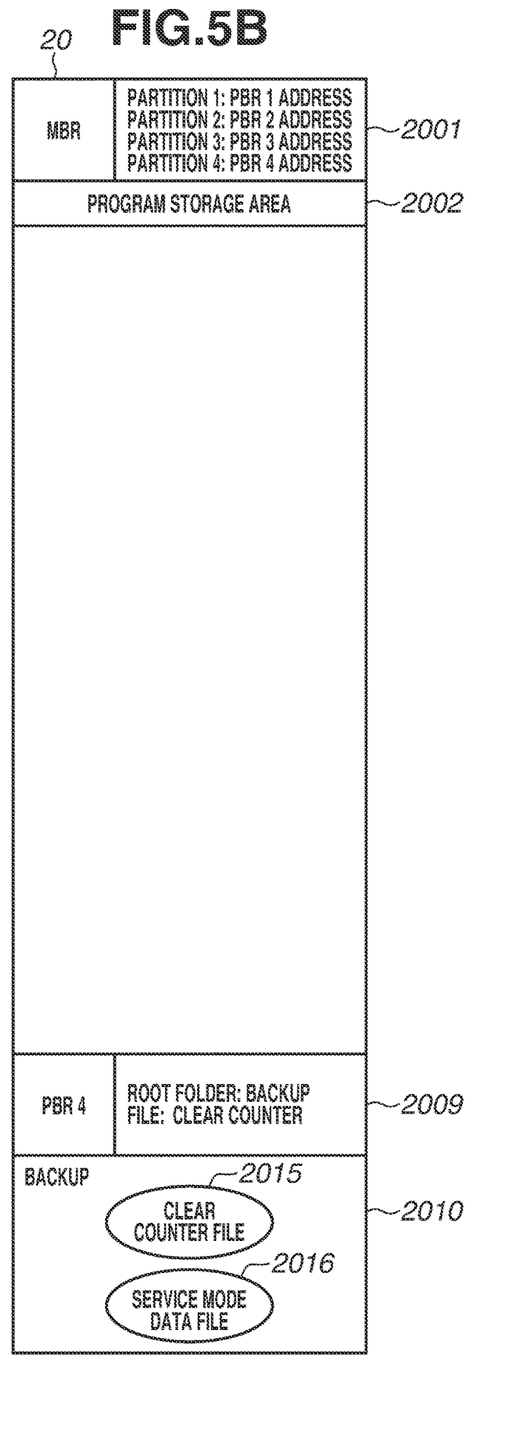

FIG. 5B illustrates a state of the internal data in the eMMC 20 after the user data is deleted.

The printer controller 10 erases data in memory address areas managed by the PBR 1, the PBR 2, and the PBR 3 in the eMMC 20 via the eMMC controller I/F 103 and deletes the partitions. Further, the printer controller 10 physically erases data on the physical address which does not correspond to the logical address.

On this occasion, the printer controller 10 sets the user data initialization flag ON in the area 1092 in the flash ROM 109.

By performing the above-described processing, file information and folder information in the PBR 1, the PBR 2, and the PBR 3, the setting data file 2013 in which the user setting data are stored, the FAX reception image data file 2011, and the FAX transmission image data file 2012 can be safely deleted.

Figure 5C:
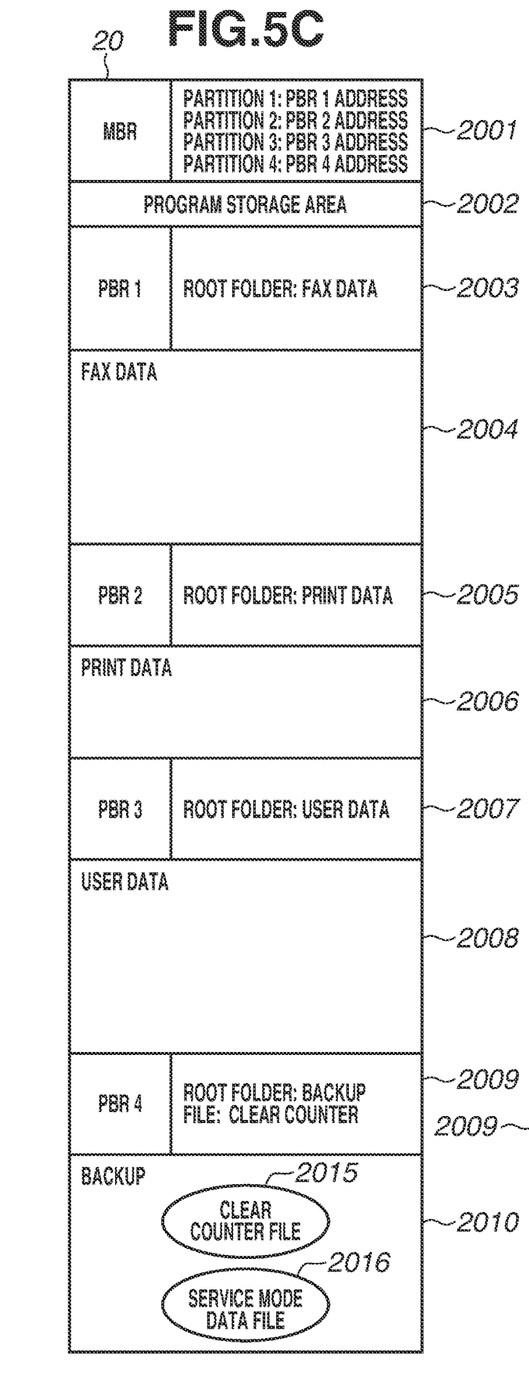

FIG. 5C illustrates a state of the internal data in the eMMC 20 after the partitions are restored.

The printer controller 10 reads the MBR 2001 from the eMMC 20 via the eMMC controller I/F 103 and confirms the partition information. Further, the printer controller 10 tries to read the PBR 1, the PBR 2, the PBR 3, and the PBR 4 based on the partition information of the MBR 2001. However, since the PBR 1, the PBR 2, and the PBR 3 have been deleted, the printer controller 10 determines that there is no partition.

The printer controller 10 generates the PBR 1, the PBR 2, and the PBR 3 based on the information described in the MBR 2001 to restore the partitions. Restoration of the partitions may be performed based on a program stored in the program storage area 2002 and the partition information stored in the boot program in the area 1091 in the flash ROM 109. The partitions become available as software after they are restored.

Figure 5D:
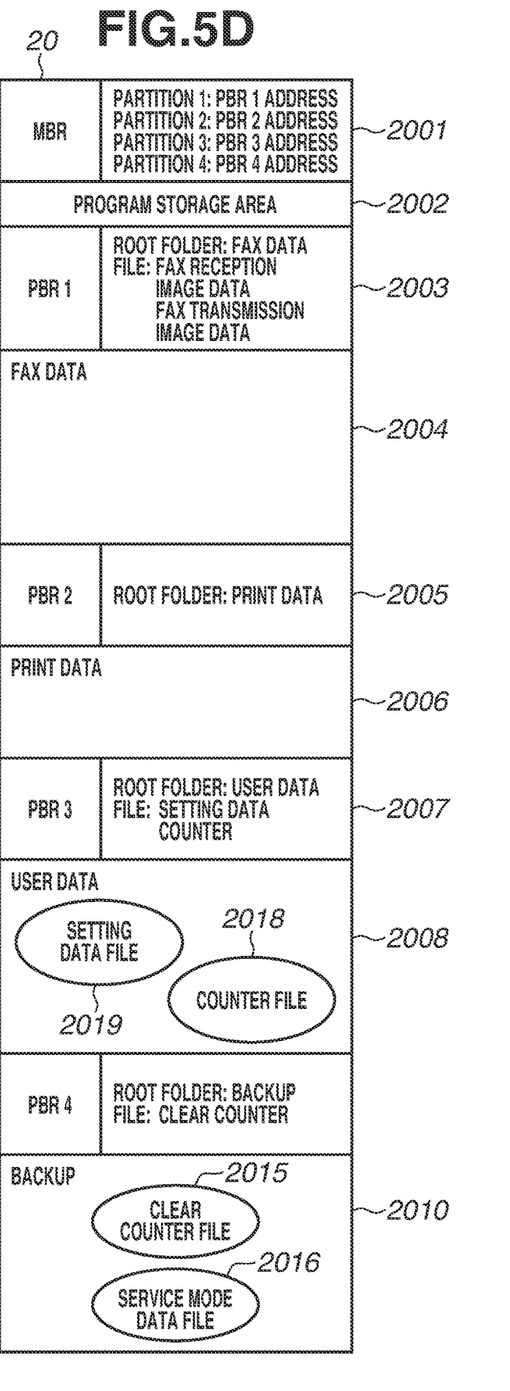

FIG. 5D illustrates a state of the internal data in the eMMC 20 after initialization is completed.

The printer controller 10 develops the shipment state data stored in the area 1093 in the RAM 102 according to a program stored in the program storage area 2002 or the boot program stored in the area 1091 in the flash ROM 109. Further, the printer controller 10 generates a file in which a setting value of the developed shipment state data is stored.

The printer controller 10 stores the generated file in the area 2008 managed by the PBR 3: 2007 via the eMMC controller I/F 103 of the printer controller 10 as a setting data file 2019. Accordingly, the initialized user setting data which is the data at the time of shipment from the factory is written in the setting data file 2019.

The printer controller 10 reads the clear counter file 2015 which is the counter file in which the total number of printed sheets is recorded and which is deleted in FIG. 5A and develops the clear counter file 2015 in the RAM 102. Further, the printer controller 10 writes the clear counter file 2015 developed in the RAM 102 in the partition 2008 managed by the restored PBR 3 as a counter file 2018. In other words, the printer controller 10 stores the counter file in which the total number of printed sheets is recorded under a different name.

After storing the file under a different name, the printer controller 10 deletes the clear counter file 2015. Accordingly, the total number of sheets printed until the initialization is performed is written as it is in the counter file 2018.

Next, the printer controller 10 reads the service setting data such as the ID of the setting value, the data size of the setting value, and information about the setting value from the service mode data file 2016 generated in FIG. 5A and updates the setting data file 2019. In this way, the service setting data before the initialization is performed are written in the setting data file 2019. Upon completion of update of the all data stored in the service mode data file 2016, the printer controller 10 deletes the service mode data file 2016.

The printer controller 10 clears the user data initialization flag in the area 1092 in the flash ROM 109 at the end.

When the clear counter file 2015 and the service mode data file 2016 are deleted from the backup in the PBR 4, the clear counter file 2015 and the service mode data file 2016 are in the deleted state. However, the data in the clear counter file 2015 and the data in the service mode data file 2016 remain in the backup area 2010 managed by the PBR 4. For this reason, the restoration of the partitions described in FIG. 5C may be performed after the backup area 2010 managed by the PBR 4: 2009, the data in the area in the PBR 4, and the data on the physical address which does not correspond to the logical address are physically erased for security.

According to the above-described processing, the internal state of the eMMC 20 about the setting value of the user setting data set by the user is restored to the state at the time of shipment from the factory. However, the data before the initialization is performed can be retained as the setting value of the service setting data set by the service person for each user. The data on the total number of printed sheets immediately before the initialization is performed can be also retained.

Figure 6A:
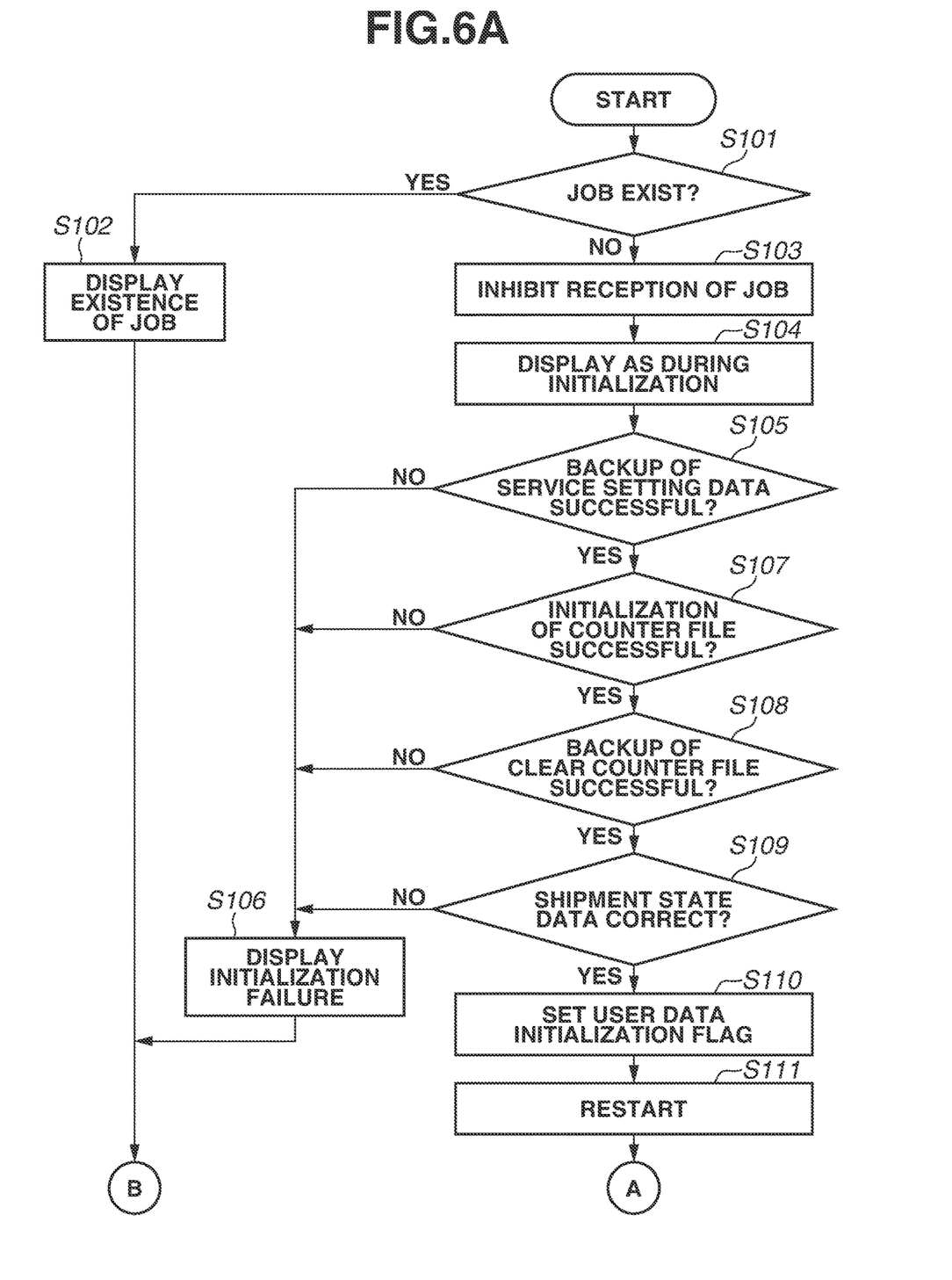
FIG. 6A is a flowchart illustrating eMMC initialization processing (a first part).
Figure 6B:
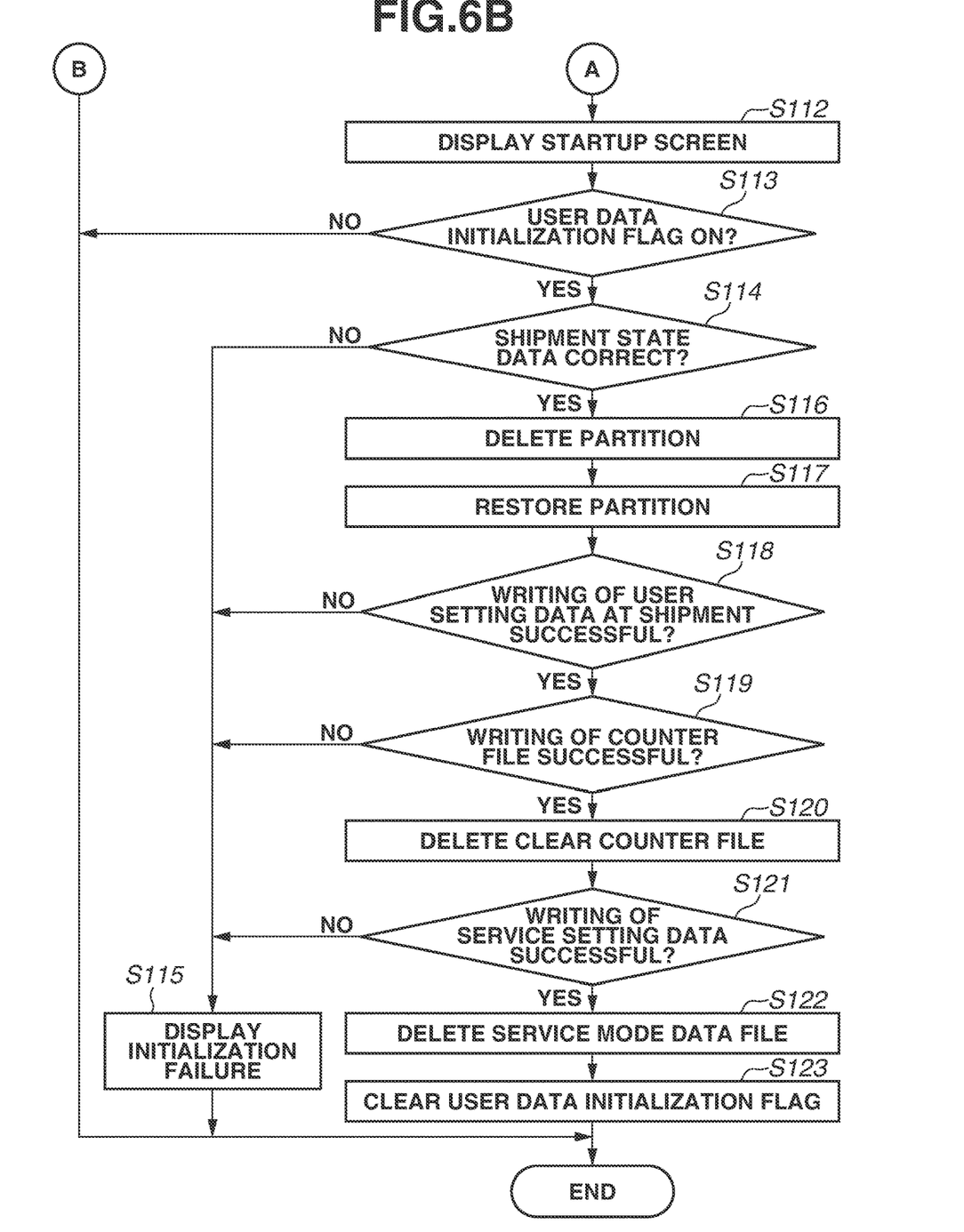
FIG. 6B is a flowchart illustrating the eMMC initialization processing (a second part).

FIGS. 6A and 6B are a flowchart illustrating processing to be performed by the CPU 101 of the printer controller 10 to initialize the eMMC 20 by executing a program stored in the eMMC 20 or the flash ROM 109.

The processing in the present flowchart is started when the user operates the operation unit 107 of the printer controller 10 and executes initialization of the user data.

In step S101, the CPU 101 confirms whether a job exists, in other words, whether the image forming apparatus 1 is processing a print job or on standby for executing the processing.

In a case where the job exists (YES in step S101), the processing proceeds to step S102.

In step S102, the CPU 101 displays that the job exists on the display unit 105 of the printer controller 10. In a case where the job exists, processing for changing the setting value of the service mode is not performed, so that the processing in the present flowchart is terminated.

If the job does not exist in step S101 (NO in step S101), the processing proceeds to step S103.

In step S103, the CPU 101 executes processing for inhibiting reception of a new job so as not to redundantly receive a job.

In step S104, the CPU 101 displays a screen indicating that processing for initializing the setting value of the service mode is in execution on the display unit 105 to indicate to a user that the initialization is in execution.

In step S105, the printer controller 10 searches for the service setting data from a menu displayed on the service mode menu screen and generates the service mode data file 2016 as a backup as illustrated in FIG. 5A.

If any problem occurs while the service mode data file 2016 is being generated (NO in step S105), the CPU 101 displays a screen indicating that the initialization has failed on the display unit 105 in step S106, and the processing in the present flowchart is terminated.

In a case where backup is successful (YES in step S105), the processing proceeds to step S107.

In the service setting data, the data in which the setting value can be changed by the user by the normal operation in the mode other than the service mode may be excluded from a file to be backed up.

In step S107, the printer controller 10 reads the counter file 2014 from the PBR 3 in the eMMC 20 as illustrated in FIG. 5A. Further, the printer controller 10 initializes the counter file 2014 except for data not specifying the user such as the total number of printed sheets and generates the clear counter file 2015.

As a value to be restored in the initialization, a value stored in a program in the program storage area 2002 in the eMMC 20 or a value of the shipment state data stored in the area 1093 in the flash ROM 109 is used.

In a case where the initialization of the counter file 2014 has failed due to some problem (NO in step S107), the CPU 101 displays the screen indicating that the initialization has failed on the display unit 105 in step S106, and the processing in the present flowchart is terminated.

In a case where the initialization of the counter file 2014 is successful (YES in step S107), the processing proceeds to step S108.

In step S108, the printer controller 10 stores, as a backup, the clear counter file 2015 from which the total number of printed sheets and the like are excluded and which is initialized. As illustrated in FIG. 5B, the clear counter file 2015 is stored in the partition (the PBR 4) which is different from the partition (the PBR 3) in the eMMC 20 in which the counter file 2014 is stored.

The initialized clear counter file 2015 may be kept stored in the RAM 102 without being read in the eMMC 20.

In a case where storing data in the eMMC 20 has failed (NO in step S108), the CPU 101 displays the screen indicating that the initialization has failed on the display unit 105 in step S106, and the processing in the present flowchart is terminated.

In a case where storing the clear counter file 2015 is successful (YES in step S108), the processing proceeds to step S109.

In step S109, the printer controller 10 confirms whether the shipment state data stored in the area 1093 in the flash ROM 109 is correct.

A known method may be used for confirming whether the data is correct. More specifically, it can be considered to use confirmation of an electronic signature and check of checksum.

In a case where the shipment state data is not correct (NO in step S109), the CPU 101 displays the screen indicating that the initialization has failed on the display unit 105 in step S106, and the processing in the present flowchart is terminated.

In a case where the shipment state data is correct (YES in step S109), the processing proceeds to step S110.

In step S110, the printer controller 10 sets the user data initialization flag to be ON in the area 1092 in the flash ROM 109.

Since the flag is set to be ON, even if any problem such as turning off of a power source occurs in a following process, the initialization of the user data can be re-executed in the processing in step S113 described below by checking the flag when the printer controller is restarted.

In step S111, the printer controller 10 is restarted.

In a case where the clear counter file 2015 initialized in step S108 is not stored in the eMMC 20 but kept stored in the RAM 102, the processing proceeds to step S116 without restarting the printer controller 10.

With reference to FIG. 6B, in step S112, the printer controller 10 displays a screen indicating that the printer controller 10 is in the middle of start-up on the display unit 105.

The printer controller 10 may check the user data initialization flag written in step S110 and display a screen indicating that the user data is being initialized, instead of displaying the screen indicating that the printer controller 10 is in the middle of start-up.

In step S113, the printer controller 10 confirms the user data initialization flag set in step S110.

In a case where the user data initialization flag is ON, in other words, in a case where the user data is being initialized (YES in step S113), the processing proceeds to step S114.

In a case where the user data initialization flag is OFF, in other words, in a case where the user data is not being initialized (NO in step S113), the processing in the present flowchart is terminated.

In step S114, as in step S109, the printer controller 10 confirms whether the shipment state data stored in the area 1093 in the flash ROM 109 is correct. In a case where setting data in the factory shipment state is not correct (NO in step S114), the processing proceeds to step S115, the printer controller 10 displays a screen indicating that the initialization processing of the user data has failed on the display unit 105, and the processing in the present flowchart is terminated. In step S115, the processing may be terminated after clearing the user data initialization flag so as not to re-execute initialization of the user data.

In a case where the setting data on the factory shipment state is correct (YES in step S114), the processing proceeds to step S116.

In step S116, the printer controller 10 erases the areas managed by the PBR 1, the PBR 2, and the PBR 3 in the eMMC 20 and deletes the partitions as illustrated in FIG. 5B. Further, the printer controller 10 physically erases data on the physical address which does not correspond to the logical address.

In step S117, the printer controller 10 performs processing for restoring each partition as illustrated in FIG. 5C. Subsequently, the processing proceeds to step S118.

In step S118, the printer controller 10 reads the shipment state data at the time of shipment from the factory from the area 1093 in the flash ROM 109. Further, the printer controller 10 writes the read shipment state data to the setting data file 2019 in the partition managed by the PBR 3: 2007 restored in step S117.

In this way, the initialized user setting data which is the data at the time of shipment from the factory is written to the setting data file 2019.

In a case where writing of the shipment state data in the setting data file 2019 has failed (NO in step S118), the processing proceeds to step S115, the printer controller 10 displays the screen indicating that the initialization processing of the user data has failed on the display unit 105, and the processing in the present flowchart is terminated.

In a case where writing of the shipment state data to the setting data file 2019 is successful (YES in step S118), the processing proceeds to step S119.

In step S119, the printer controller 10 writes the clear counter file 2015 stored as the backup in step S108 in the partition (the PBR 3) restored in step S117 as the counter file 2018 as illustrated in FIG. 5D.

In this way, the total number of sheets printed until the initialization is performed is written as it is to the counter file 2018.

In a case where writing of the counter file 2018 has failed (NO in step S19), the processing proceeds to step S115, the printer controller 10 displays the screen indicating that the initialization processing of the user data has failed on the display unit 105, and the processing in the present flowchart is terminated.

In a case where writing of the counter file 2018 is successful (YES in step S119), the processing proceeds to step S120.

In step S120, the printer controller 10 deletes the clear counter file 2015 which is the initialized counter file managed by the PBR 4: 2009.

In step S121, the printer controller 10 reads the service mode data file 2016 stored in step S105 and writes the setting value in the service mode to the setting data file 2019 restored in step S118.

In this way, the service setting data before the initialization is performed is written to the setting data file 2019.

In a case where writing of the service setting data has failed (NO in step S121), the processing proceeds to step S115, the printer controller 10 displays the screen indicating that the initialization processing of the user data has failed on the display unit 105, and the processing in the present flowchart is terminated.

In a case where writing of the service setting data is successful (YES in step S121), the processing proceeds to step S122.

In step S122, the printer controller 10 deletes the service mode data file 2016 managed by the PBR 4: 2009.

As described above, the restoration of the partition in step S117 may be performed after the data in the backup area 2010 managed by the PBR 4: 2009 and the data on the physical address which does not correspond to the logical address are physically erased for security.

In step S123, the printer controller 10 clears the user data initialization flag stored in the area 1092 in the flash ROM 109.

Then, the processing in the present flowchart is terminated.

As described above, by performing the processing illustrated in the present flowchart, the internal data in the eMMC 20 can be initialized to the state at the time of shipment from the factory while the setting value before the internal data is initialized can be retained as the service setting data set by the service person for each user. The data on the total number of printed sheets immediately before the internal data is initialized can be also retained.

Both of a method for storing the service setting data without deleting the service setting data according to the present exemplary embodiment and a conventional method for deleting the service setting data and restoring the state at the time of shipment from the factory may be executable, and the operation unit may be configured to select either one of the methods in a case where the user data is to be initialized.

The present disclosure may be applied to a system including a plurality of devices and an apparatus including a single device.

The present disclosure is not limited to the above-described exemplary embodiments and can be modified in various ways based on the gist of the present disclosure. In this respect, the various modifications are not excluded from the scope of the present disclosure. In other words, each of the above-described exemplary embodiments, the modifications, and combinations thereof are all included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-130395, filed Jul. 10, 2018, which is hereby incorporated by reference herein in its entirety.

What is claimed is:

1. An image forming apparatus comprising:
a first storage including at least a first storage area and a second storage area, the first storage area storing at least a first type of data and a second type of data;
a controller having one or more processor which executes instructions stored in one or more memory, the controller being configured to, in initialization in which at least the first storage area is initialized but the second storage area is not initialized:
initialize the first storage area storing the first type of data without keeping the first type of data in the second storage area, the first type of data not being data set by a service mode, and
store the second type of data in the second storage area, initialize the first storage area storing the second type of data, and store the second type of data stored in the second storage area in the initialized first storage area, the second type of data being data set by a service mode.

2. The image forming apparatus according to claim 1, wherein the first type of data is data to be set on a first setting screen.

3. The image forming apparatus according to claim 1, wherein the second type of data is data to be set on a second setting screen which is not displayed by a normal operation of a user but displayed by an operation different from the normal operation.

4. The image forming apparatus according to claim 3, wherein the controller is configured to perform initialization to select either retaining, as the second type of data, the setting value immediately before the initialization is performed or restoring the second type of data to a setting value at the time of shipment from the factory.

5. The image forming apparatus according to claim 1,
wherein the image forming apparatus further comprises a printer configured to print an image on a sheet, and
wherein the first storage area includes an area in which print data is stored and an area in which setting data regarding user setting set by a user is stored, and
the second storage area is an area in which data to be used for backup is stored.

6. The image forming apparatus according to claim 5,
wherein the image forming apparatus further comprises a second storage,
wherein the first type of data is the setting data, and
wherein the second storage stores a setting value at the time of shipment from the factory corresponding to the setting data.

7. The image forming apparatus according to claim 6, wherein the controller, in performing initialization, initializes the first type of data by writing the setting value at the time of shipment from the factory corresponding to the setting data from the second storage.

8. A method for controlling an image forming apparatus, the method comprising:
initializing in which at least a first storage area is initialized but a second storage area is not initialized,
initializing the first storage area keeping a first type of data without storing the first type of data in the second storage area, the first type of data not being data set by a service mode, and
storing a second type of data in the second storage area, initialize the first storage area storing the second type of data, and store the second type of data stored in the second storage area in the initialized first storage area, the second type of data being data set by a service mode.

9. A non-transitory computer readable storage medium storing a program for causing a computer to execute the method for controlling an image forming apparatus, the method comprising:
initializing in which at least a first storage area is initialized but a second storage area is not initialized,
initializing the first storage area keeping a first type of data without storing the first type of data in the second storage area, the first type of data not being data set by a service mode, and
storing a second type of data in the second storage area, initialize the first storage area storing the second type of data, and store the second type of data stored in the second storage area in the initialized first storage area, the second type of data being data set by a service mode.

* * * * *